United States Patent
Reibman et al.

(10) Patent No.: US 8,855,211 B2
(45) Date of Patent: Oct. 7, 2014

(54) METHOD AND APPARATUS FOR MANAGING VIDEO TRANSPORT

(75) Inventors: Amy Ruth Reibman, Chatham, NJ (US); David John Poole, Maplewood, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1126 days.

(21) Appl. No.: 12/017,758

(22) Filed: Jan. 22, 2008

(65) Prior Publication Data

US 2009/0187958 A1    Jul. 23, 2009

(51) Int. Cl.
| | |
|---|---|
| *H04B 1/66* | (2006.01) |
| *G06K 9/42* | (2006.01) |
| *G06K 9/40* | (2006.01) |
| *H04N 7/173* | (2011.01) |
| *H04N 21/654* | (2011.01) |
| *H04N 19/89* | (2014.01) |
| *H04N 21/6375* | (2011.01) |
| *H04N 21/24* | (2011.01) |
| *H04N 21/658* | (2011.01) |
| *H04N 21/6332* | (2011.01) |
| *H04N 21/845* | (2011.01) |
| *H04N 21/6377* | (2011.01) |

(52) U.S. Cl.
CPC ....... *H04N 21/654* (2013.01); *H04N 19/00939* (2013.01); *H04N 21/6375* (2013.01); *H04N 21/2402* (2013.01); *H04N 21/658* (2013.01); *H04N 21/6332* (2013.01); *H04N 21/8456* (2013.01); *H04N 21/6377* (2013.01)
USPC ........ 375/240.27; 382/256; 382/266; 725/90; 725/105

(58) Field of Classification Search
USPC .............. 725/91–97, 107, 114–114; 370/352; 709/224
See application file for complete search history.

(56) References Cited

U.S. PATENT DOCUMENTS

| | | | |
|---|---|---|---|
| 5,742,892 A * | 4/1998 | Chaddha ...................... 725/146 |
| 6,289,054 B1 * | 9/2001 | Rhee ........................ 375/240.27 |
| 6,665,271 B1 * | 12/2003 | Thomas et al. ................ 370/252 |
| 6,704,451 B1 * | 3/2004 | Hekstra et al. ................ 382/266 |
| 8,488,901 B2 * | 7/2013 | Berestov et al. .............. 382/274 |
| 2002/0018490 A1 * | 2/2002 | Abrahamsson et al. ...... 370/477 |
| 2002/0031188 A1 * | 3/2002 | Negishi et al. ........... 375/240.26 |
| 2004/0071086 A1 * | 4/2004 | Haumont et al. ............. 370/230 |
| 2004/0261113 A1 * | 12/2004 | Paul et al. ........................ 725/90 |
| 2005/0030369 A1 * | 2/2005 | Ryu ........................... 348/14.01 |
| 2005/0110875 A1 * | 5/2005 | Ma et al. .................... 348/208.1 |
| 2005/0265321 A1 * | 12/2005 | Rappaport et al. ............ 370/352 |
| 2006/0050633 A1 * | 3/2006 | Lee et al. ...................... 370/229 |
| 2007/0121506 A1 * | 5/2007 | Wydrowski et al. .......... 370/231 |
| 2007/0121507 A1 * | 5/2007 | Manzalini et al. ............ 370/235 |
| 2007/0171928 A1 * | 7/2007 | Kim et al. ..................... 370/412 |
| 2007/0180106 A1 * | 8/2007 | Pirzada et al. ................ 709/224 |
| 2007/0242662 A1 * | 10/2007 | Connor ........................ 370/352 |
| 2007/0296854 A1 * | 12/2007 | Berkey et al. .............. 348/412.1 |
| 2008/0084934 A1 * | 4/2008 | Agrawal .................. 375/240.27 |
| 2008/0144518 A1 * | 6/2008 | Rosenwald et al. .......... 370/250 |

* cited by examiner

*Primary Examiner* — Brian T Pendleton
*Assistant Examiner* — Dika C. Okeke
(74) *Attorney, Agent, or Firm* — Guntin & Gust, PLC; Jay H. Anderson

(57) ABSTRACT

A method and apparatus for managing video transport is disclosed. A system that incorporates teachings of the present disclosure may include, for example, a server having a controller to predict visibility to a viewer of packet loss impairment for communicated video content based at least in part on scene information for one or more packets of the video content. Other embodiments are disclosed.

24 Claims, 6 Drawing Sheets

100

500

METHOD AND APPARATUS FOR MANAGING VIDEO TRANSPORT

FIELD OF THE DISCLOSURE

The present disclosure relates generally to communication systems and more specifically to a method and apparatus for managing video transport.

BACKGROUND

The communication or transport of video content, such as transmitting movies over the Internet, is growing in popularity. Whether being transported over the Internet or from a more direct access line, such as from a local cable company, the video content quality can be affected by packet loss. Packet loss can be caused by a number of factors, including signal degradation over the network medium, oversaturated network links, corrupted packets rejected in-transit, faulty networking hardware, maligned system drivers or network applications, or normal routing routines. Quality assessment of the delivered video content has been done based on metrics such as packet loss rate. However, such metrics do not necessarily correlate with a user's viewing experience.

To maintain quality, a sender of video content can retransmit lost packets. However, the amount of re-transmission affects the overall throughput of the connection. For a network experiencing a significant amount of packet loss, the re-transmission of lost packets of a video content can significantly reduce the throughput for the transport of the video content.

DETAILED DESCRIPTION

In one embodiment of the present disclosure, a computer-readable storage medium can have computer instructions for predicting visibility to a viewer of packet loss impairment for communicated video content based at least in part on at least one of temporal proximity to a transition between scenes, camera motion and temporal proximity to a concealment frame for one or more lost packets of the video content.

In another embodiment of the present disclosure, a method can involve predicting visibility to a viewer of packet loss impairment for communicated video content based at least in part on scene information for one or more packets of the video content.

In another embodiment of the present disclosure, a server can have a controller to predict visibility to a viewer of packet loss impairment for communicated video content based at least in part on scene information for one or more packets of the video content.

In another embodiment of the present disclosure, a set top box can have a controller to predict visibility to a viewer of packet loss impairment for communicated video content based at least in part on scene information for one or more lost packets of the video content.

In another embodiment of the present disclosure, a communication device can have a controller to predict visibility to a viewer of packet loss impairment for video content that has been communicated from or received by the communication device. The visibility prediction can be based at least in part on at least one of temporal proximity to a scene cut, camera motion and temporal proximity to a concealment frame for one or more packets of the video content.

Figure 1:
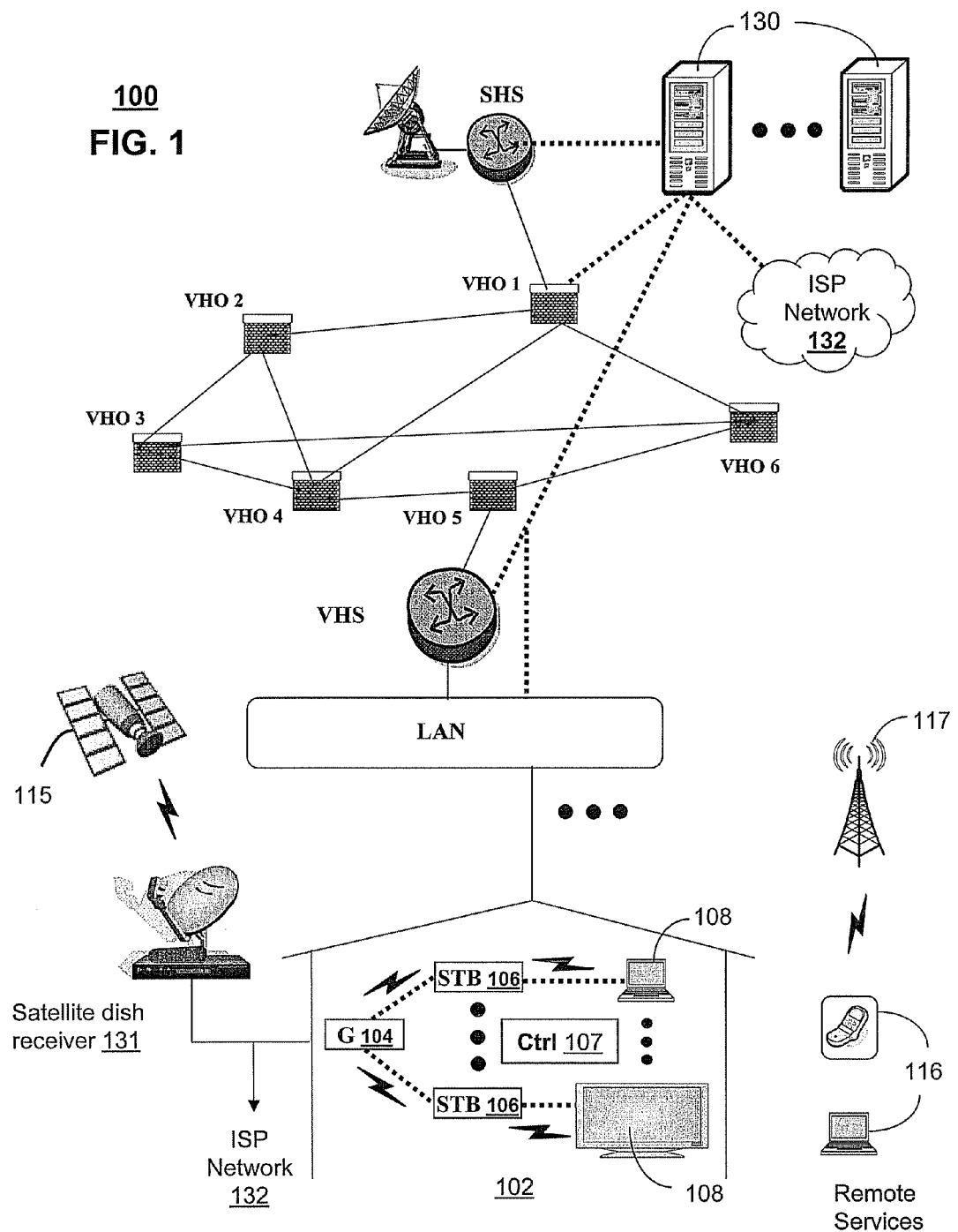
FIGS. 1-3 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130, a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

In one embodiment, the one or more computing devices 130 can be used as a video monitoring or management system 130 for collecting and analyzing information associated with communicating video data in the first communication system 100. For example, management system 130 can monitor packet loss associated with transport of video content. In another embodiment, the management system 130 can determine or otherwise provide information associated with packet loss visibility for video content being transported or otherwise transmitted in the communication system 100. For example, the management system 130 can retrieve or otherwise determine scene information about the scene depicted in the video content at the time of the packet loss. The scene information and the detected packet loss can be used to predict packet loss impairment visibility to a viewer. As another example, the scene information can include camera motion, proximity to scene change, and/or proximity to concealment frame. The management system 130 can compare the detected packet loss with the scene information using a number of techniques. For example, individual video packets can be flagged or otherwise indicated with the relevant scene information.

Other information can be analyzed by the management system 130 for predicting visibility of packet loss impairment to a viewer including edge artifacts, such as temporal, horizontal or vertical edges. For instance, a moving vertical edge that is continuous in the encoded signal can become disjointed in the decoded signal due to the packet loss impairment. The management system 130 can determine the existence of such a moving vertical edge in the packets and predict an increase in viewer visibility if one or more packets associated with the moving vertical edge were lost or otherwise removed from transport.

In one embodiment, the management system 130 can monitor for or otherwise determine the use of texture masking, luminance masking, and motion masking of the video content in the packets, and the management system can predict a decrease in viewer visibility if one or more packets associated with this masking were lost or otherwise removed from transport. In another embodiment, the management system 130 can monitor for or otherwise determine the use of motion tracking in smoothly moving regions of the video content in the packets, and the management system can predict an increase in viewer visibility if one or more packets associated with this tracking were lost or otherwise removed from transport. In another embodiment, the management system 130 can monitor for or otherwise determine signal variance and/or motion variability of the video content in the packets, and the management system can predict a decrease in viewer visibility if one or more packets associated with this variance and/or variability were lost or otherwise removed from transport.

Other information can be utilized in predicting packet loss impairment, including analysis of the encoding algorithm and its parameters, the packetization strategy, and/or how the decoder handles errors. In one embodiment, this information, as well as other information, can be utilized for prediction of viewer visibility of packet loss impairment in combination with the camera motion, proximity to scene change, and/or proximity to concealment frame associated with the lost packet. For instance, a video encoder or video server can retrieve and/or provide information associated with the error (e.g., which macroblocks are initially in error, the initial error of those macroblocks, the macroblock types, and the motion vectors subsequent to the loss which define the error propagation) and associated with the encoded signal without impairment at the location of the packet loss impairment in order to facilitate assessment of the video quality. A video quality monitor can compute or otherwise determine similar information associated with the decoded signal that includes the packet loss impairment. In one embodiment, the management system 130 can determine characteristics of the error, including the size, spatial pattern, duration and location as part of the prediction of viewer visibility of the packet loss impairment.

The management system 130 can monitor for packet loss and assess video quality in one or more portions of the communication system 100. For example, management system 130 can be used to manage video content transport within a private or virtual private network of the communication system 200. In one embodiment, the management system 130 can be incorporated into the STBs, such as a processor for detecting packet loss and predicting visibility to a viewer of the packet loss based on scene information.

In another embodiment, the management system 130 can be used to alleviate traffic congestion or otherwise reduce the number of packets being transported for a video. For example, the management system 130 can predict which (if any) packets would be less visible to a viewer if removed from transport or otherwise dropped based on the scene information. The management system 130 can then drop the selected packets or provide visibility data associated with the packets to the transmitter or other device that can then remove the packets or otherwise drop them from transport. This selective dropping of packets based on viewer visibility and the scene information can reduce the load of traffic on a network while maintaining a desired level of quality of the video. As described above, the management system 130 can be a separate device or system and/or the management system can be part of a communication device that is transmitting or receiving the video, including an STB, a service provider server, a mobile communication device, and so forth.

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems. Communication system 100 can also operate as an IP Multimedia Subsystem (IMS) conforming in part to protocols defined by standards bodies such as 3GPP (Third Generation Partnership Protocol).

Figure 2:
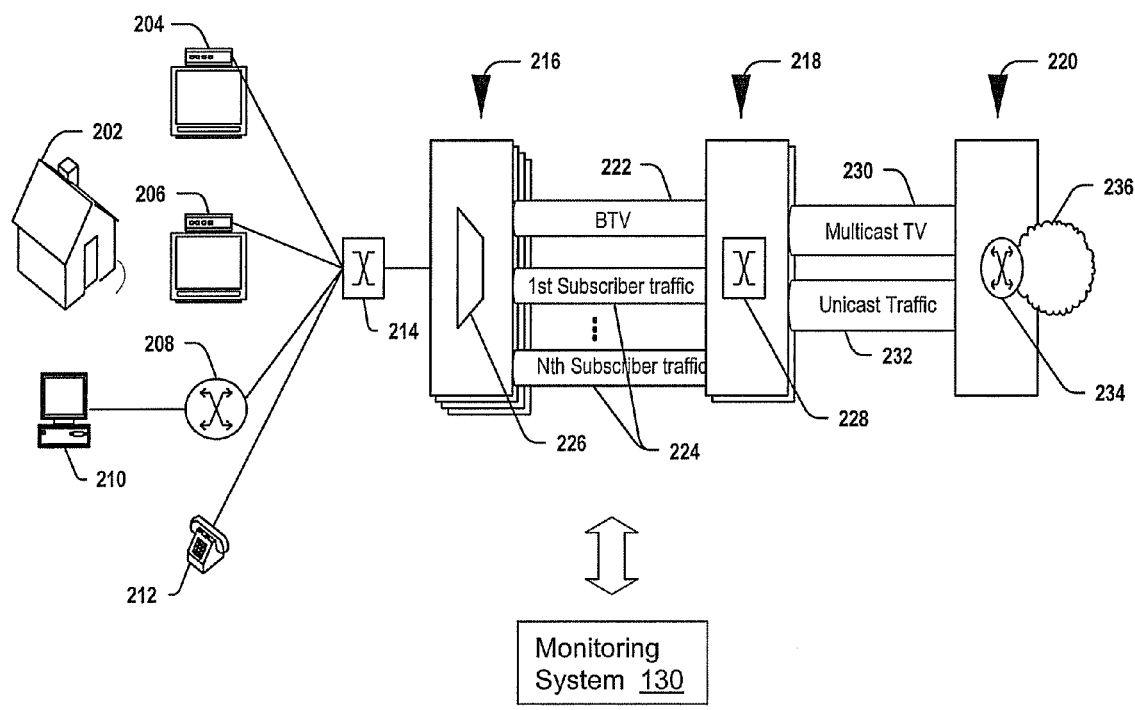

FIG. 2 depicts an exemplary embodiment of a second communication system 200 for delivering media content. Communication system 200 can be overlaid or operably coupled with communication system 100 as another representative embodiment of said communication system. The system 200 can include a distribution switch/router system 228 at a central office 218. The distribution switch/router system 228 can receive video data via a multicast television stream 230 from a second distribution switch/router 234 at an intermediate office 220. The multicast television stream 230 can include Internet Protocol (IP) data packets addressed to a multicast IP address associated with a television channel. The distribution switch/router system 228 can cache data associated with each television channel received from the intermediate office 220.

The distribution switch/router system 228 can also receive unicast data traffic from the intermediate office 220 via a unicast traffic stream 232. The unicast traffic stream 232 can include data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206.

The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, can receive a channel change command from an input device, such as a remoter control device. The channel change command can indicate selection of an IPTV channel. After receiving the channel change command, the set-top box device 204 can generate channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222. The management system 130 of FIG. 1 can be applied to the second communication system 200 for purposes of collecting and analyzing information associated with communicating video data in the second communication system.

Figure 3:
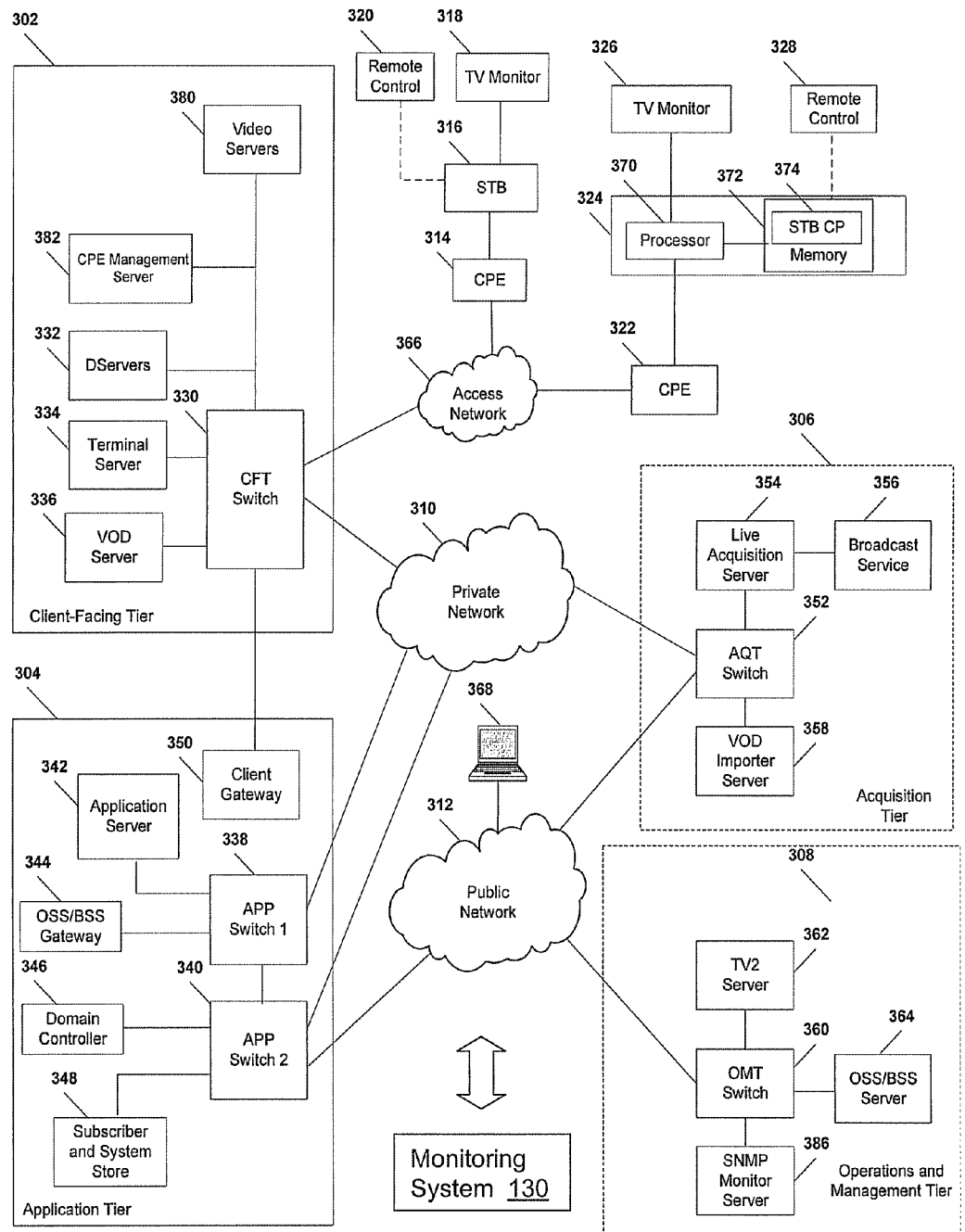

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312. The management system 130 of FIGS. 1-2 can be applied to the third communication system 300 for purposes of collecting and analyzing information associated with communicating video data in the third communication system.

It should be apparent to one of ordinary skill in the art from the foregoing media system embodiments that other suitable media systems for distributing broadcast media content, as well as peer-to-peer exchange of content, can be applied to the present disclosure.

Figure 4:
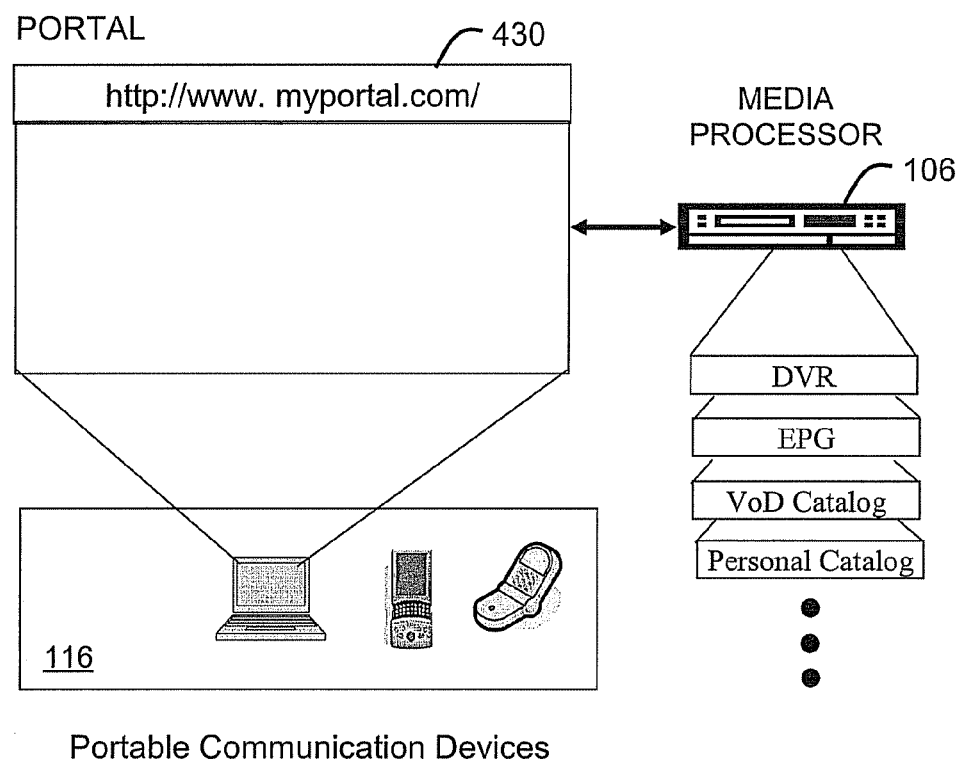
FIG. 4 depicts an exemplary embodiment of a portal interacting with at least one among the communication systems of FIGS. 1-3.

FIG. 4 depicts an exemplary embodiment of a portal 430. The portal 430 can be used for managing services of communication systems 100-300. The portal 430 can be accessed by a Uniform Resource Locator (URL) with a common Internet browser such as Microsoft's Internet Explorer using an Internet-capable communication device such as references 108, 116, or 210 of FIGS. 1-2. The portal 430 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 5:
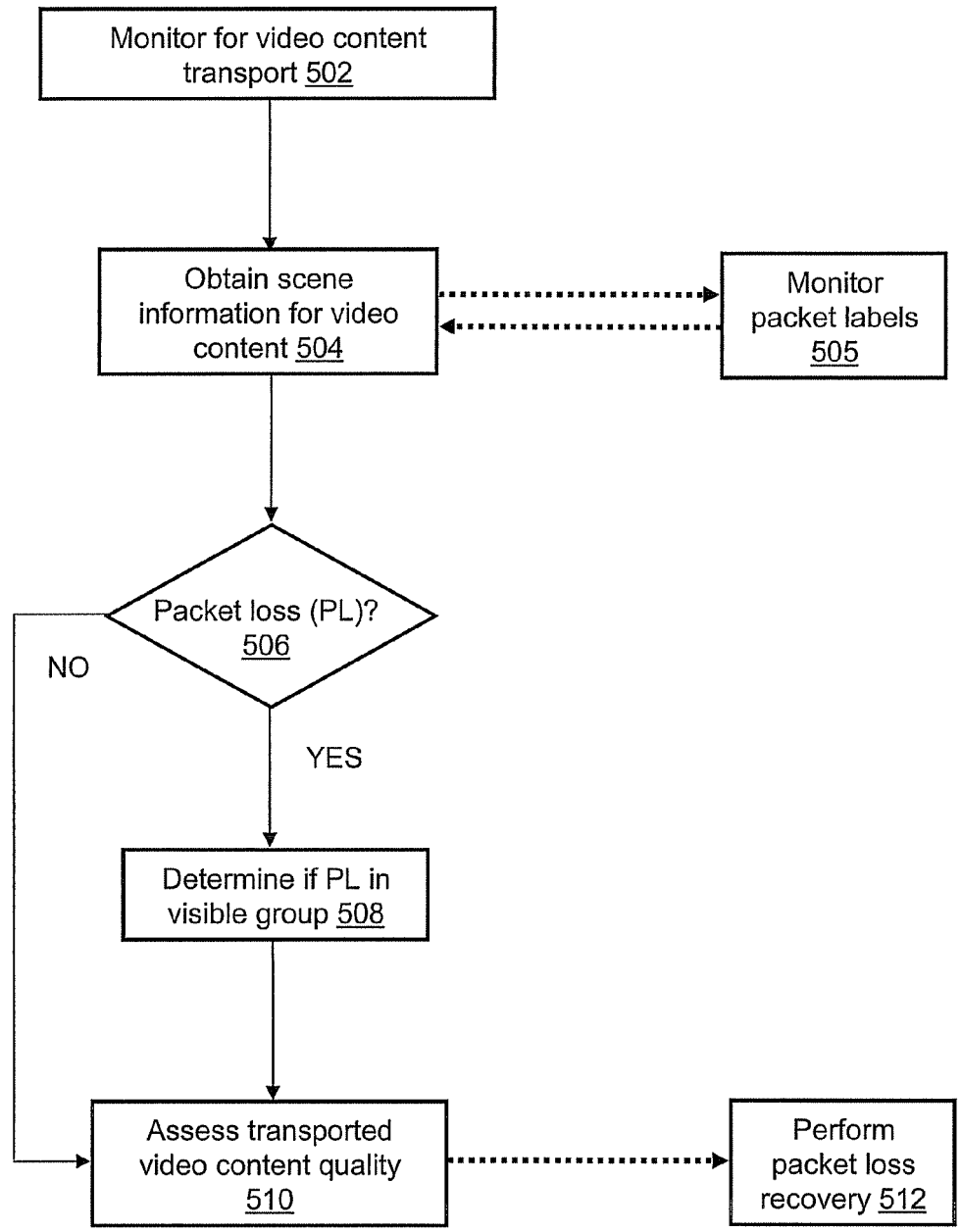
FIG. 5 depicts an exemplary method operating in portions of the communication systems of FIGS. 1-3.

FIG. 5 depicts an exemplary method 500 operating in portions of one or more of the communication systems 100-300. Method 500 has variants as depicted by the dashed lines. It would be apparent to an artisan with ordinary skill in the art that other embodiments not depicted in FIG. 5 are possible without departing from the scope of the claims described below.

Method 500 begins with step 502 where the video management system 130 or some other system or device can monitor for transport of video content, such as in a network. The technique used for monitoring or otherwise determining when video content is being transported can vary. For example, the video management system 130 can be notified when such transport is occurring (e.g., a notification sent from the source) or can monitor packets to make such a determination. In one embodiment, the video management system 130 can monitor for transport of video content associated with only a portion of the network or communication system, such as video content being transported from a particular source, such as a media service provider. In another embodiment, the video management system 130 can perform the monitoring based on the format of the data being transported, such as monitoring all MPEG-2 packets.

The particular type of data transport can vary, including via compression such as MPEG-2 or H.264 protocol. The source and recipient or recipients can also vary. For example, the source and recipient(s) can be one or more communication devices (e.g., mobile phones) transmitting video content amongst themselves. As another example, the source can be a media provider or distributor and the recipient(s) can be customers of the provider. Other configurations of sources and recipients are also contemplated by the present disclosure. The particular path of transport can also vary, such as over the internet or within a private or virtual private network.

In step 504, the video management system 130 can retrieve or otherwise obtain scene information for the video content. For example, one or more of the packets being transported can have an indicia for scene information of the video content within the particular packet. In one embodiment, each of the packets can have scene information, although the present invention contemplates less than each of the packets having scene information. The scene information can be associated with one or both of camera motion and proximity to a scene change. For example, the scene information can indicate that the packet contains frames having camera motion that is still, panning, zooming and/or a complex motion. As another example, the scene information can indicate temporal proximity to a scene cut. In one embodiment, the packets can have scene labels, tags or flags which are monitored by the video management system 130 as in step 505 to provide the scene information.

In step 506, the video management system 130 can determine whether a packet loss has occurred for a transport of a video content. The particular technique utilized for detecting the packet loss can vary, including sequence numbering in a transmission control protocol (TCP). If packet loss has occurred then in step 508, the video management system 130 can determine if the packet loss falls within a visible group. For example, the video management system 130 can analyze the scene information to determine the camera motion associated with the frames or the temporal proximity of the frames to a scene change. In one embodiment, the video management system 130 can determine frames associated with panning or zooming camera motion for the frame are more visible than frames associated with still camera. In another embodiment, the video management system 130 can determine frames associated with complex camera motion for the frame are also more visible. In another embodiment, the video management system 130 can determine packet loss more than twelve frames prior to a scene cut, more than eight frames after a scene cut and at a scene cut are more visible than packet loss for frames falling outside those temporal ranges. The present disclosure also contemplates the use of other temporal proximity values with respect to the scene cut for predicting visibility for a viewer.

In one embodiment, the video management system 130 can determine the proximity of the frame associated with the lost packet from a concealing frame. For instance, the video management system 130 can predict a higher visibility as the lost packet frame becomes farther from a concealment frame, such as greater than three frames away.

In step 510, the video management system 130 can assess the quality of the transported video content based on the detected packet loss and the scene information. The video management system 130 can predict visibility to a viewer of packet loss impairment based on scene information associated with the lost packets. For example, the assessment can occur during transport and be based on each packet loss that falls within the more visible criteria. In one embodiment as in step 512, packet loss recovery can be applied to the video content being transported, such as through re-transmission of lost packets that fall within the more visible criteria and/or error concealment techniques being applied to those more visible lost packets. In another embodiment, packet loss recovery can be applied to all packet losses until throughput reaches a threshold and then the packet loss recovery can be limited to the lost packets falling within the more visible criteria. In another embodiment, the assessment of the video quality can be of the entire video content after transport based on a predetermined threshold for visible packet loss, such as a quality control monitor.

Upon reviewing the aforementioned embodiments, it would be evident to an artisan with ordinary skill in the art that said embodiments can be modified, reduced, or enhanced without departing from the scope and spirit of the claims described below. For example, the packet loss detection and the prediction of packet loss visibility based on the scene information can be performed by separate devices or systems in communication with each other. In one embodiment, the video management system 130 can retrieve scene information for each of the packets that were lost rather than all of the packets of the video content.

As another example, the source of the scene information can vary. For instance, the scene information can be included in the packets, such as the scene labels, or can be retrieved from another source, including a database that stores scene information for each of the packets, such as based on sequence numbering. As a further example, the assessment of the video quality can be used for different functions. For instance, the assessment can be part of a quality monitoring technique or can be part of a loss recovery technique.

In one embodiment, the use of scene information, including camera motion, temporal proximity to a scene transition and/or proximity of the lost packet frame to a concealment frame, can be used for reducing the number of packets to be transported while maintaining a desired quality of the video. For instance, packets that are less visible can be removed or dropped from transport to lessen the network traffic, while more visible packets can be transported. The particular number of packets to be dropped or removed from transport can depend on a number of factors, such as the amount of traffic congestion, the desired quality, and the type of scene information associated with each of the packets.

Other suitable modifications that can be applied to the present disclosure without departing from the scope of the claims below. Accordingly, the reader is directed to the claims section for a fuller understanding of the breadth and scope of the present disclosure.

Figure 6:
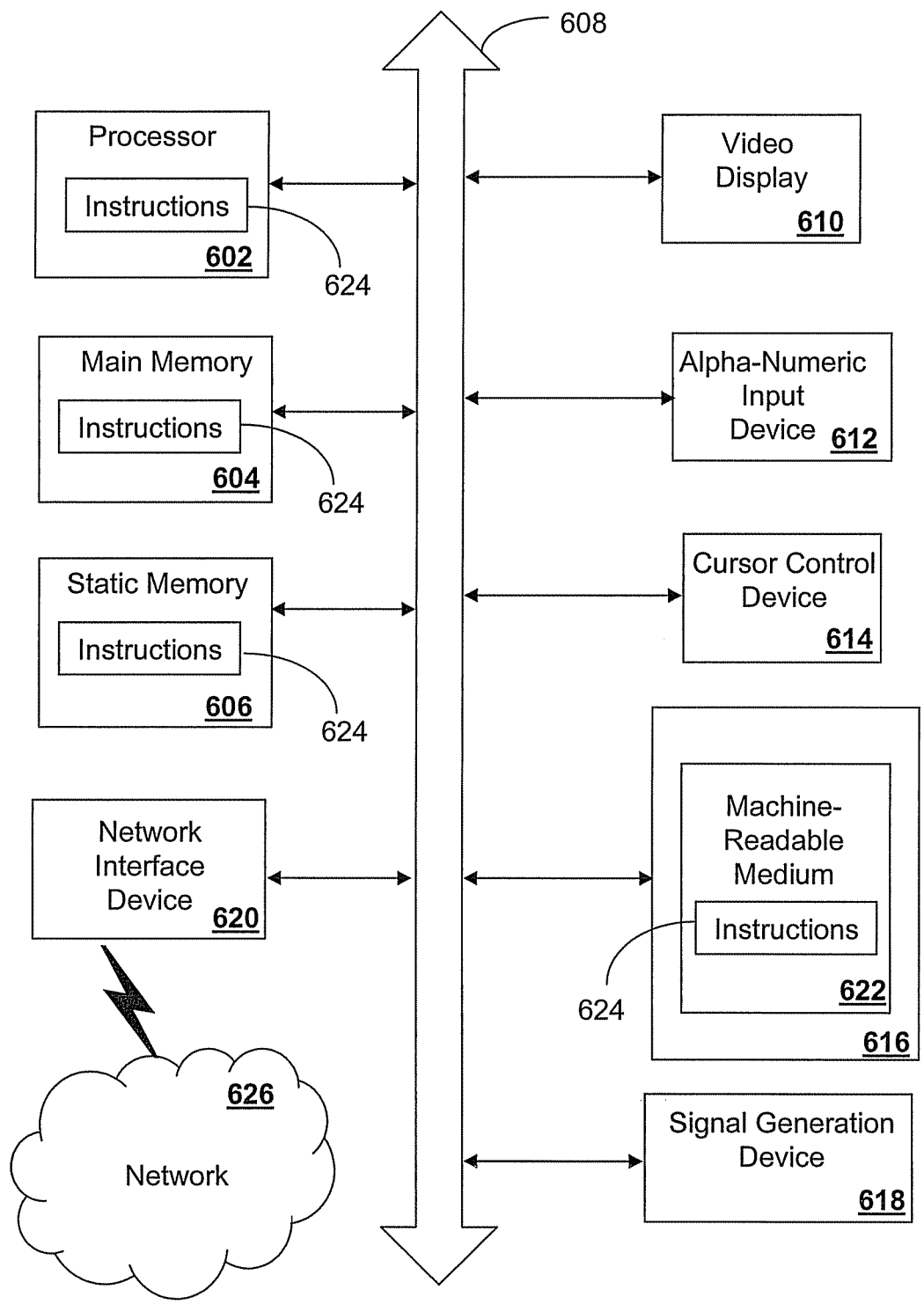
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium in a set-top box, comprising instructions, which when executed by a processor of the set-top box, cause the processor to perform operations comprising:

detecting traffic congestion in a network from which a plurality of packets corresponding to video content are communicated to the set-top box, the plurality of packets comprising a group of packets;

predicting packets of a first type in the group of packets which when removed from communicated video content would have a first likelihood that a viewer would recognize a first impairment in a first video presentation of the video content presented by the set-top box, in accordance with analysis of information comprising edge artifacts of the group of packets, the edge artifacts comprising temporal, horizontal or vertical edges, the analysis comprising detecting a moving vertical edge in a scene depicted in the video content, wherein a packet associated with the moving vertical edge is of the first type;

predicting packets of a second type in the group of packets which when removed from the communicated video content would have a second likelihood that a viewer would not recognize a second impairment in a second video presentation of the video content presented by the set-top box; and lessening the detected traffic congestion by removing from the video content a number of the predicted packets of the second type, thereby applying the analysis for the group of packets to that group of packets, while substantially retaining in the communicated video content the predicted packets of the first type to achieve a desired quality of the video content; and determining whether a lost packet removed from the communicated video content comprises a frame temporally located at a transition between scenes or temporally located outside a range from twelve frames prior to the transition between scenes to eight frames after the transition between scenes.

2. The storage medium of claim 1, wherein the operations further comprise applying packet loss recovery based on the predicted packets of the first type or the second type.

3. The storage medium of claim 1, wherein the operations further comprise monitoring for packet loss.

4. The storage medium of claim 1, wherein the operations further comprise determining a plurality of camera motion, temporal proximity to a transition between scenes, and temporal proximity to a concealment frame based on scene labels of a lost packet.

5. The storage medium of claim 4, wherein the operations further comprise determining whether the camera motion is panning, zooming, complex motion or still.

6. The storage medium of claim 1, wherein the information further comprises temporal edges for a lost packet of the video content, horizontal edges for the lost packet of the video content, vertical edges for the lost packet of the video content, texture masking for the lost packet of the video content, luminance masking for the lost packet of the video content, motion masking for the lost packet of the video content, or motion tracking for the lost packet of the video content.

7. A method comprising:
predicting which packets in a plurality of packets comprising a group of packets corresponding to video content, when removed from video content directed to a recipient device, would have a likelihood that a viewer would not recognize an impairment in a video presentation of the video content presented by the recipient device, in accordance with analysis of information comprising edge artifacts of the group of packets, the edge artifacts comprising temporal, horizontal or vertical edges, the analysis comprising detecting a moving vertical edge in a scene depicted in the video content, wherein a packet associated with the moving vertical edge when removed from the video content would have a likelihood that the viewer would recognize an impairment;

removing a number of the predicted packets, thereby applying the analysis for the group of packets to that group of packets, while maintaining a desired quality of the video content to lessen traffic congestion in a communication network supplying the video content; and determining whether a lost packet removed from the video content comprises a frame temporally located at a transition between scenes or temporally located outside a range from twelve frames prior to the transition between scenes to eight frames after the transition between scenes.

8. The method of claim 7, wherein the prediction is based on scene information for a packet of the video content, and wherein the scene information comprises temporal proximity to the transition between scenes, camera motion or temporal proximity to a concealment frame.

9. The method of claim 8, further comprising re-transmitting the packet when the scene information comprises panning camera motion, zooming camera motion, a frame temporally located at a transition between scenes, a frame temporally located outside a range from twelve frames prior to the transition between scenes to eight frames after the transition between scenes, or a frame more than three frames from a concealment frame.

10. The method of claim 8, wherein the information further comprises temporal edges for a packet of the video content, horizontal edges for the packet of the video content, vertical edges for the packet of the video content, texture masking for the packet of the video content, luminance masking for the packet of the video content, motion masking for the packet of the video content, or motion tracking for the packet of the video content.

11. The method of claim 8, further comprising:
predicting the packets based on communication of the video content occurring within a network; and
monitoring for packet loss in the network.

12. The method of claim 8, further comprising removing the number of the predicted packets while in transit to the recipient device.

13. The method of claim 8, further comprising determining whether the camera motion is panning, zooming, complex motion or still.

14. A server comprising:
a memory;
a controller coupled to the memory, wherein the memory comprises instructions which when executed by the controller, cause the controller to perform operations comprising:
receiving data to predict which packets in a plurality of packets comprising a group of packets corresponding to video content, when removed from the video content directed to a set-top box, would be less recognizable to a viewer as an impairment in a video presentation of the video content presented by the set-top box, wherein the data is determined from analysis of information comprising edge artifacts of the group of packets, the edge artifacts comprising temporal, horizontal or vertical edges, the analysis comprising detecting a moving vertical edge in a scene depicted in the video content, wherein a packet associated with the moving vertical edge when removed from the video content would be recognizable to the viewer as an impairment;
lessening traffic congestion in a communication network supplying the video content by removing a number of the predicted packets, thereby applying the analysis for the group of packets to that group of packets, while maintaining a desired quality of the video content; and determining whether a lost packet removed from the video content comprises a frame temporally located at a transition between scenes or temporally located outside a range from twelve frames prior to the transition between scenes to eight frames after the transition between scenes.

15. The server of claim 14, wherein the operations further comprise re-transmitting a packet when a predicted visibility of the impairment exceeds a pre-determined threshold.

16. The server of claim 14, wherein the data is further determined according to scene information, and wherein the scene information comprises temporal proximity to the transition between scenes, camera motion, or temporal proximity to a concealment frame.

17. The server of claim 15, wherein the operations further comprise removing the packet from transport based on the predicted visibility of the impairment.

18. The server of claim 15, wherein the data is associated with packet loss, and wherein the operations further comprise determining if the packet loss is within a visible group based on scene information.

19. A set top box, comprising:

a memory;

a controller coupled to the memory, wherein the memory comprises instructions which when executed by the controller, cause the controller to perform operations comprising:

predicting which packets in a plurality of packets comprising a group of packets corresponding to video content, when removed from the video content communicated to a set-top box, would be less visible to a viewer as an impairment in a video presentation of the video content, wherein the prediction is based on scene information of the packets and on analysis of information comprising edge artifacts of the group of packets, the edge artifacts comprising temporal, horizontal or vertical edges, the analysis comprising detecting a moving vertical edge in a scene depicted in the video content, wherein a packet associated with the moving vertical edge when removed from the video content would be visible to the viewer as an impairment;

removing a number of the predicted packets, thereby applying the analysis for the group of packets to that group of packets, while maintaining a desired quality of the video content to lessen traffic congestion in a communication network supplying the communicated video content; and determining whether a lost packet removed from the video content comprises a frame temporally located at a transition between scenes or temporally located outside a range from twelve frames prior to the transition between scenes to eight frames after the transition between scenes.

20. The set top box of claim 19, wherein the scene information comprises temporal proximity to the transition between scenes, camera motion, or temporal proximity to a concealment frame.

21. The set top box of claim 20, wherein the operations further comprise requesting a re-transmission of a lost packet when a predicted visibility of the impairment reaches a pre-determined threshold.

22. The set top box of claim 19, wherein the operations further comprise transmitting data associated with packet loss.

23. A communication device comprising:

a memory;

a controller coupled to the memory, wherein the memory comprises instructions which when executed by the controller, cause the controller to perform operations comprising:

predicting which packets in a plurality of packets comprising a group of packets corresponding to video content, when removed from the video content directed to the communication device, would be less visible to a viewer as an impairment of a video presentation of the video content by the communication device, in accordance with analysis of information comprising edge artifacts of the group of packets, the edge artifacts comprising temporal, horizontal or vertical edges, the analysis comprising detecting a moving vertical edge in a scene depicted in the video content, wherein a packet associated with the moving vertical edge when removed from the video content would be visible to the viewer as an impairment;

removing a number of the predicted packets, thereby applying the analysis for the group of packets to that group of packets, while maintaining a desired quality of the video content to lessen traffic congestion in a communication network supplying the video content; and determining whether a lost packet removed from the video content comprises a frame temporally located at a transition between scenes or temporally located outside a range from twelve frames prior to the transition between scenes to eight frames after the transition between scenes.

24. The communication device of claim 23, wherein the operations further comprise requesting re-transmission of a packet when a predicted visibility of the impairment meets a pre-determined threshold, re-transmitting of the packet when the predicted visibility meets the pre-determined threshold, or removing the packet from transport when the predicted visibility meets the pre-determined threshold.

* * * * *